(12) United States Patent
Guterman

(10) Patent No.: US 7,093,009 B2
(45) Date of Patent: Aug. 15, 2006

(54) UPLOADING PERSONAL AGENTS TO PERSONALIZE NETWORK SERVICES

(75) Inventor: Jose Guterman, Calgary (CA)

(73) Assignee: Intel Corporation, Santa Clara, CA (US)

(*) Notice: Subject to any disclaimer, the term of this patent is extended or adjusted under 35 U.S.C. 154(b) by 762 days.

(21) Appl. No.: 09/899,659

(22) Filed: Jul. 5, 2001

(65) Prior Publication Data
US 2003/0007618 A1 Jan. 9, 2003

(51) Int. Cl.
*G06F 15/173* (2006.01)
*G06F 15/16* (2006.01)

(52) U.S. Cl. ............ 709/223; 709/202; 709/203; 709/224; 709/246; 379/201.03; 379/207.02

(58) Field of Classification Search ........ 709/220–229, 709/317, 201–203, 217–219, 246; 719/318, 719/317; 379/201.01, 201.02, 201.03, 207.02
See application file for complete search history.

(56) References Cited

U.S. PATENT DOCUMENTS

| | | | | |
|---|---|---|---|---|
| 5,541,986 A | * | 7/1996 | Hou | 379/201.03 |
| 5,761,288 A | * | 6/1998 | Pinard et al. | 379/201.03 |
| 5,905,958 A | * | 5/1999 | Houde | 455/437 |
| 5,937,048 A | * | 8/1999 | Pelle | 379/207.02 |
| 5,937,347 A | * | 8/1999 | Gordon | 455/415 |
| 6,076,099 A | * | 6/2000 | Chen et al. | 709/202 |
| 6,131,118 A | * | 10/2000 | Stupek et al. | 709/223 |
| 6,157,708 A | * | 12/2000 | Gordon | 379/207.02 |
| 6,163,794 A | * | 12/2000 | Lange et al. | 709/202 |
| 6,240,450 B1 | * | 5/2001 | Sharples et al. | 709/224 |
| 6,393,296 B1 | * | 5/2002 | Sabnani et al. | 455/466 |
| 6,411,697 B1 | * | 6/2002 | Creamer et al. | 379/201.12 |
| 6,418,146 B1 | * | 7/2002 | Miloslavsky | 370/400 |
| 6,529,784 B1 | * | 3/2003 | Cantos et al. | 709/203 |
| 6,546,002 B1 | * | 4/2003 | Kim | 370/351 |
| 6,606,663 B1 | * | 8/2003 | Liao et al. | 709/229 |
| 6,611,869 B1 | * | 8/2003 | Eschelbeck et al. | 709/228 |
| 6,650,901 B1 | * | 11/2003 | Schuster et al. | 379/45 |
| 6,728,360 B1 | * | 4/2004 | Brennan | 379/201.01 |
| 6,747,970 B1 | * | 6/2004 | Lamb et al. | 370/352 |

* cited by examiner

*Primary Examiner*—Bharat Barot
(74) *Attorney, Agent, or Firm*—Trop, Pruner & Hu, P.C.

(57) ABSTRACT

A subscriber unit in a telephone network may receive personalized services from a network by providing personalized software to the network. The subscriber unit may prepare or have prepared particular personal agent software that implements certain enhanced functions designed by or for the subscriber. That software may then be uploaded to the network. Upon the occurrence of a certain event, the personal agent software is executed by the network to provide the personalized service desired by the subscriber. In some cases, the network may afford a variety of primitives which may implement basic functions that may be called by the personal agent software.

11 Claims, 2 Drawing Sheets

UPLOADING PERSONAL AGENTS TO PERSONALIZE NETWORK SERVICES

BACKGROUND

This invention relates generally to the provision by a network of telecommunication services.

Commonly a network service provider provides a variety of enhanced services to telephone service subscribers. For example, conventional telephone networks may provide a call forwarding function, enabling users to enable or disable the call forwarding function. In addition, network services currently include the ability to set a call forwarding number. Likewise, current network services allow the user to specify call forwarding triggers such as "no answer", "busy", or "always". Similarly, network service providers may allow limited personalization of voice mail and other call services as well.

To receive enhanced network services, the subscriber must accept certain constraints associated with the provision of such services. While network service providers may allow limited personalization, they do not allow more general personalization by their subscribers.

In many cases, users of telephone systems can greatly personalize the way local systems operate. A range of services may be programmed into local PBX systems for example.

Thus, there is a need to enable network service providers to provide personalized services to their subscribers.

DETAILED DESCRIPTION

Figure 1:
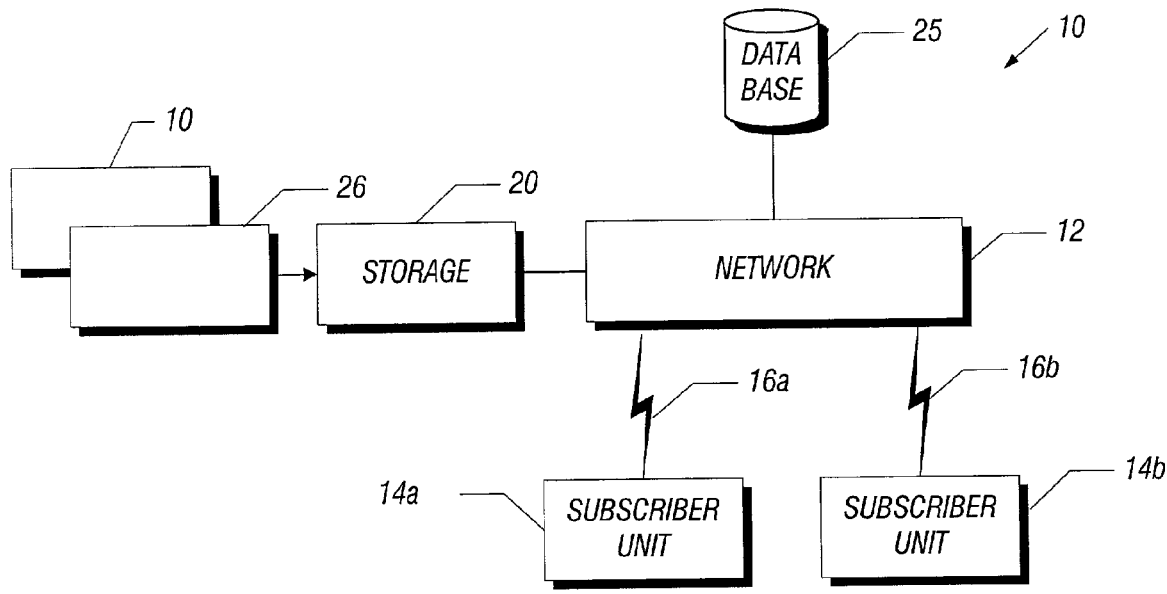
FIG. 1 is a schematic depiction of a network in accordance with one embodiment of the present invention.

Referring to FIG. 1, a telecommunications network 10 may be wired or wireless. That is, the network 12 may communicate with subscriber units 14 over a wireless or land line based system 16. In the case of wireless communications 16, the subscriber unit 14 may be a wireless telephone and in the case of a land line system 16, the subscriber unit 14 may be a conventional land line telephone. The network 12 may provide telephone communication services as well as enhanced services for those subscribers who desire them. In one embodiment, the network 12 may include switching equipment and may be packet-based or circuit switched. In some embodiments, the network 12 is operated by processor-based systems that include a storage 20 that may store software 10 and 26. In addition, the network 12 may communicate with a database 25.

Figure 2:
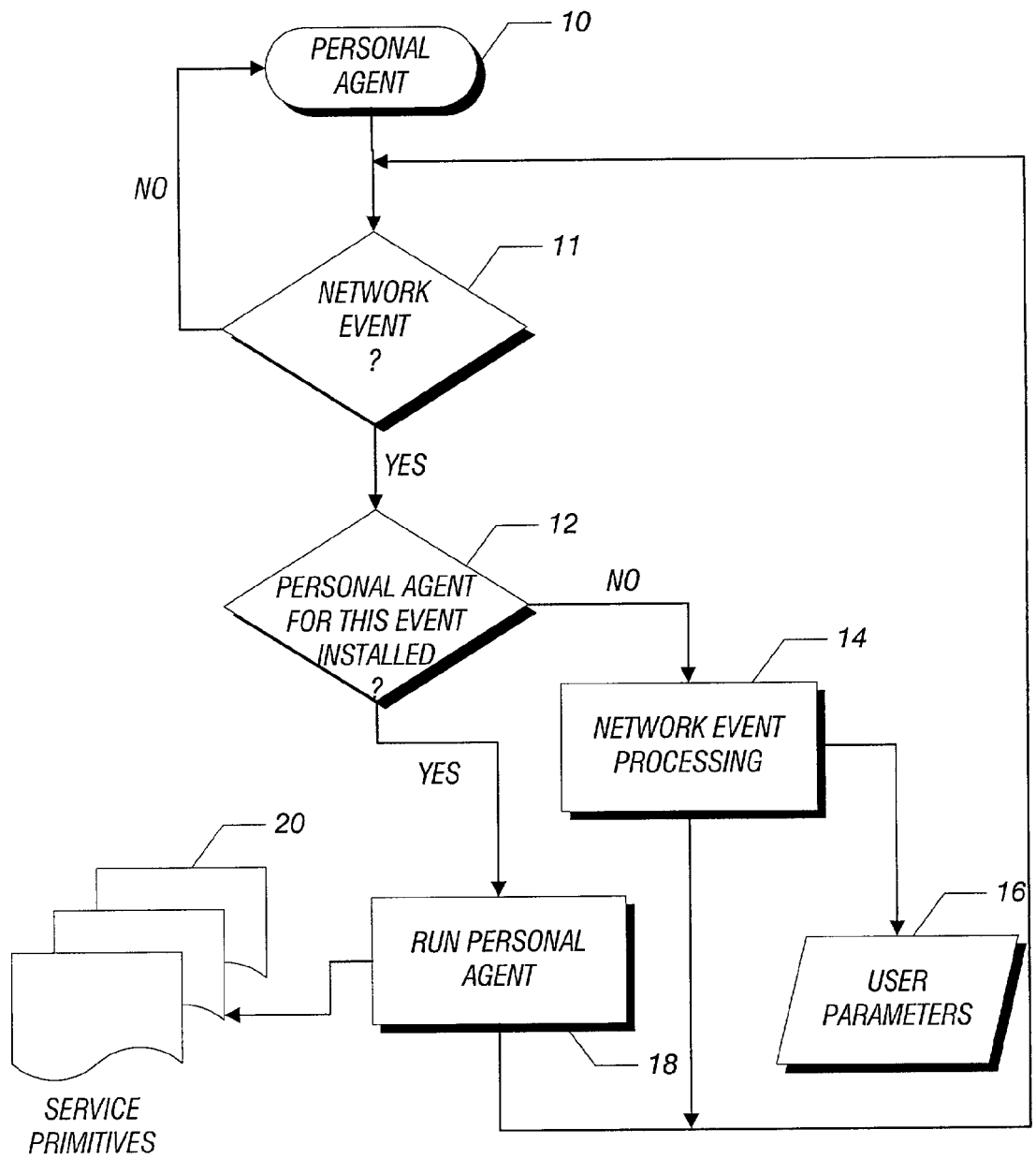
FIG. 2 is a flow chart for personal agent software in accordance with one embodiment of the present invention.

Referring to FIG. 2, the network 12 may receive a software upload from a subscriber unit 14 to enable personalization of network services. As an example, a subscriber unit 14 may upload personal agent software, in an appropriate format, to enable the network 12 to provide personalized call forwarding services. Unlike conventionally implemented network call forwarding services, the subscriber may, in fact, provide the software to implement relatively complex functions. The software is then actually executed by a processor-based system associated with the network 12.

Other call functions that may be implemented by personal agent software may include call recording, call screening, call logs, voice mail, call waiting or other incoming call handling functions, reporting call charges, directing incoming calls, selecting routes, personalizing ringers, caller identification, conference calling, and automatic dialing, to provide some additional examples.

Thus, personal agent software 10 provided by the subscriber units 14 may ultimately be stored on the storage 20. A check at diamond 11 determines whether a network event has occurred. A network event may be one of a plurality of events such as receipt of a telephone call, the lack of an answer of an incoming call, the passage of time, or any other network detectable event. When an event occurs, a check at diamond 12 determines whether personal agent software 14 for that event has been installed for the appropriate subscriber. If so, that subscriber's personal agent software is run on the network 12 as indicated in block 18. The personal agent software may call network 12 provided service primitives 20. The service primitives 20 may be software code for implementing common telecommunications functions. In the call forwarding example, the basic function of forwarding calls to another number may be executed by an appropriate primitive 20.

In the event no personal agent for the event has been installed for a particular subscriber, the conventional network event processing is utilized as indicated in block 14 relying on user supplied parameters 16. For example, in keeping with the call forwarding example described previously, the default network event processing may simply forward the call to a particular number specified by the user as a user parameter 16.

Figure 3:
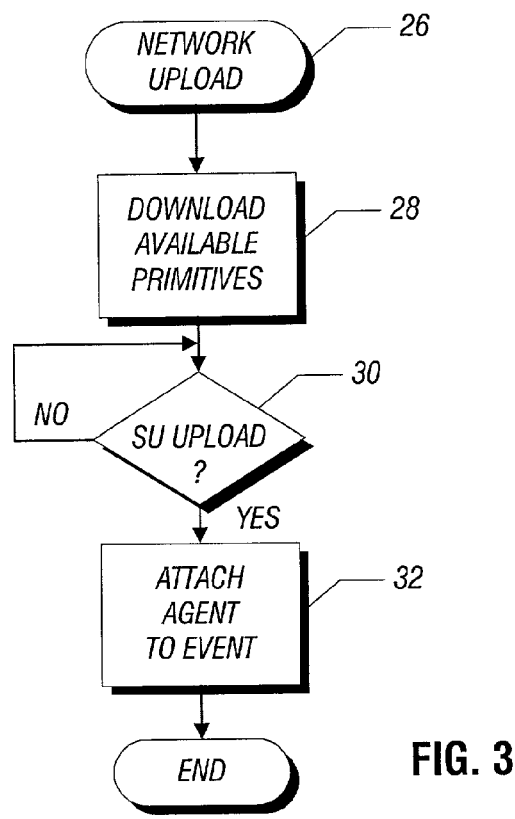
FIG. 3 is a depiction of network download software in accordance with one embodiment of the present invention.

Turning next to FIG. 3, software 26 for enabling the network to upload the agent software from a subscriber unit 14 begins by downloading information about the available primitives as indicated in block 28 in accordance with one embodiment. This download may simply be a list of the primitives which a particular network service provider offers and which may be utilized by uploaded software. A check at diamond 30 determines whether subscriber unit 14 is ready to upload personal agent software. If so, the personal agent may be attached to the appropriate events and stored as indicated in block 32.

Thus, a subscriber unit 14a or 14b may supply personal agent software to the network 12 to implement personalized network originated services. In this way, the subscriber may provide the personalization as desired. The network 12 then merely detects the occurrence of events which trigger the provision of personalized services, runs the personal agent software and in some embodiments, provides primitives to implement desired services. However, how those primitives are called, the events that trigger the provision of the primitive services and the way those services are provided may be personalized by the subscriber.

In some cases, the subscriber may actually write the personal agent software. In other cases, the subscriber may purchase available software, using graphical user interfaces or other tools to appropriately personalize the software, and then upload the software to the network 12. The provision of the personal agent software may be over the appropriate network connections 16 or may be by way of an auxiliary connection. For example, in connection with a telephone network, the providing of the personal agent software may be done over a computer network such as a local area network, a metropolitan area network or the Internet. For example, in one embodiment, a subscriber may access the network provider's web site and may simply provide the agent software through that web site. Alternatively the software may be uploaded over the communication network 12 itself.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The invention claimed is:

1. A method comprising:
   detecting the occurrence of a network event;
   upon detecting the occurrence of said network event, determining whether personal agent software for the event has been received from a subscriber; and
   if said personal agent for said event has been received from said subscriber, executing said personal agent software to provide services to said subscriber.

2. The method of claim 1 wherein if personal agent software for the event has not been received, processing the event using network event processing.

3. The method of claim 1 including detecting the occurrence of an event, and upon the detection of the occurrence of an event, selecting an appropriate agent to run.

4. The method of claim 3 including making available service primitives to implement network call functions to personal agent software that provides personalized services to a telephone network subscriber.

5. An article comprising a computer readable medium storing instructions that enable a processor-based system by executing the instructions to:
   detect the occurrence of a network event;
   upon detection of the network event, determine whether personal agent software for the event has been received from a subscriber; and
   if said personal agent software for said event has been received from said subscriber, execute said personal agent software to provide services to said subscriber.

6. The article of claim 5 further storing instructions that enable the processor-based system by executing the instructions to:
   process the event using network event processing if personal agent software for the event has not been received.

7. The article of claim 5 further storing instructions that enable the processor-based system by executing the instructions to:
   detect the occurrence of an event, and upon the detection of the occurrence of the event, select an appropriate agent to run.

8. The article of claim 7 further storing instructions that enable the processor-based system by executing the instructions to:
   make available service primitives to implement network call functions to personal agent software that provides personalized services to a telephone network subscriber.

9. A system comprising:
   a processor; and
   a storage storing instructions that enable the processor to receive personal agent software from a subscriber and execute said personal agent software to provide services to said subscriber for a telephone network, said storage also storing a plurality of primitives to implement standard call functions, said personal agent software to call those primitives to implement standard call functions.

10. The system of claim 9 wherein said system is coupled to the telephone network to receive said personal agent software.

11. The system of claim 9 wherein said system receives said personal agent software over the Internet.

* * * * *